United States Patent
Malmgren et al.

(10) Patent No.: US 12,206,350 B2
(45) Date of Patent: Jan. 21, 2025

(54) METHOD OF CONTROLLING AN ELECTRIC MOTOR OF A TIGHTENING TOOL

(71) Applicant: ATLAS COPCO INDUSTRIAL TECHNIQUE AB, Stockholm (SE)

(72) Inventors: Morris Malmgren, Saltsjö-Boo (SE); Guillermo Bossi, Järfälla (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 18/715,823

(22) PCT Filed: Nov. 7, 2022

(86) PCT No.: PCT/EP2022/080951
§ 371 (c)(1),
(2) Date: Jun. 3, 2024

(87) PCT Pub. No.: WO2023/104408
PCT Pub. Date: Jun. 15, 2023

(65) Prior Publication Data
US 2024/0421731 A1 Dec. 19, 2024

(30) Foreign Application Priority Data
Dec. 10, 2021 (SE) .................... 2130352-4

(51) Int. Cl.
*B25B 23/14* (2006.01)
*B23P 19/06* (2006.01)
(Continued)

(52) U.S. Cl.
CPC .............. *H02P 6/08* (2013.01); *B23P 19/066* (2013.01); *B25B 21/00* (2013.01); *B25B 23/14* (2013.01); *B23P 19/06* (2013.01); *B25B 23/147* (2013.01)

(58) Field of Classification Search
CPC ....... B25B 23/14; B25B 23/147; B25B 21/00; B23P 19/06; B23P 19/066
(Continued)

(56) References Cited

U.S. PATENT DOCUMENTS 5,410,229 A * 4/1995 Sebastian .................. H02P 3/08
 318/434
6,296,427 B1 * 10/2001 Potter ..................... B25F 5/001
 408/124
(Continued)

FOREIGN PATENT DOCUMENTS

| CN | 101786178 B | 10/2012 |
|---|---|---|
| CN | 109476001 A | 3/2019 |

(Continued)

OTHER PUBLICATIONS

Atlas Copco Industrial Technique AB, International Patent Application No. PCT/EP2022/080951, International Search Report, Mar. 16, 2023.
(Continued)

*Primary Examiner* — Scott A Smith
(74) *Attorney, Agent, or Firm* — Moore & Van Allen PLLC; W. Kevin Ransom

(57) ABSTRACT

A method of controlling an electric motor of a tightening tool during a tightening operation, the method comprising: a) controlling the electric motor to run at a first motor speed using a first motor speed setpoint value, b) obtaining a torque or motor current value of the electric motor, c) determining a second motor speed setpoint value lower than or equal to the first motor speed setpoint value, based on an efficiency of the tightening tool at the torque or motor current value and the first motor speed setpoint value, d) setting the second motor speed setpoint value as the first motor speed setpoint value, e) controlling the electric motor to run at a second motor speed using the first motor speed (Continued)

setpoint value after step d), and repeating steps b)-e) until a predetermined motor speed or torque has been reached.

15 Claims, 2 Drawing Sheets

(51) Int. Cl.
  *B25B 21/00* (2006.01)
  *H02P 6/08* (2016.01)
  *B25B 23/147* (2006.01)

(58) Field of Classification Search
  USPC .................. 173/1, 2, 176, 178, 216, 217
  See application file for complete search history.

(56) References Cited

U.S. PATENT DOCUMENTS

| | | | |
|---|---|---|---|
| 6,536,536 B1* | 3/2003 | Gass .................. | B25F 5/021 |
| | | | 173/171 |
| 7,400,106 B2* | 7/2008 | DeCicco .............. | H02P 7/29 |
| | | | 318/434 |
| 7,770,658 B2* | 8/2010 | Ito ..................... | B25B 23/1475 |
| | | | 173/176 |
| 8,674,640 B2* | 3/2014 | Suda .................. | B25B 21/02 |
| | | | 173/4 |
| 9,162,331 B2* | 10/2015 | Tang .................. | H02P 29/02 |
| 9,281,770 B2* | 3/2016 | Wood ................. | H02P 6/08 |
| 9,352,456 B2* | 5/2016 | Murthy .............. | B25B 23/14 |
| 10,821,591 B2* | 11/2020 | Verbrugge ......... | B25B 21/02 |
| 2002/0153856 A1* | 10/2002 | Gilmore ............. | B25B 23/147 |
| | | | 318/599 |
| 2005/0263304 A1 | 12/2005 | Sainomoto et al. | |
| 2011/0000688 A1* | 1/2011 | Iwata ................. | H02P 29/032 |
| | | | 700/170 |
| 2013/0068491 A1 | 3/2013 | Kusakawa et al. | |
| 2015/0002054 A1 | 1/2015 | Frankstein | |
| 2015/0025538 A1 | 1/2015 | Kust | |
| 2016/0318165 A1* | 11/2016 | Thorson ............. | B25B 23/141 |
| 2020/0324397 A1 | 10/2020 | Brunner et al. | |

FOREIGN PATENT DOCUMENTS

| | | |
|---|---|---|
| EP | 2380704 A1 | 10/2011 |
| EP | 2839931 A1 | 2/2015 |
| EP | 2868436 A1 | 5/2015 |
| EP | 3287237 A1 | 2/2018 |
| WO | 2013143489 A1 | 10/2013 |
| WO | 2014144946 A2 | 9/2014 |
| WO | 2019095009 A1 | 5/2019 |

OTHER PUBLICATIONS

Atlas Copco Industrial Technique AB, International Patent Application No. PCT/EP2022/080951, Written Opinion, Mar. 16, 2023.
Atlas Copco Industrial Technique AB, International Patent Application No. PCT/EP2022/080951, International Preliminary Report on Patentability, Jul. 7, 2023.
Atlas Copco Industrial Technique AB, Swedish Patent Application No. 2130352-4, Office Action, Aug. 23, 2022.
Atlas Copco Industrial Technique AB, Chinese Patent Application No. 202280081212.X, First Office Action, Sep. 11, 2024.

* cited by examiner

METHOD OF CONTROLLING AN ELECTRIC MOTOR OF A TIGHTENING TOOL

CROSS-REFERENCE TO RELATED APPLICATIONS

This application is a National Stage Patent Application (filed under 35 § U.S.C. 371) of PCT/EP2022/080951, filed Nov. 7, 2022 of the same title, which, in turn claims priority to Swedish Patent Application No. 2130352-4 filed Dec. 10, 2021 of the same title; the contents of each of which are hereby incorporated by reference.

TECHNICAL FIELD

The present disclosure generally relates to electrically powered tightening tools.

BACKGROUND

Industrial tightening tools such as nutrunners and screwdrivers are widely used in the manufacturing industry, for example in vehicle manufacturing and the aerospace industry.

There are various tightening tool strategies currently employed by tightening tools. An example of such a strategy is to control the speed of the tool based on the joint stiffness and adjust the tightening speed as the torque begins to build up.

SUMMARY

Existing tightening strategies may result in that the tightening tool heats up to a degree where it needs to be cooled down after a number of tightening operations, and/or, in case of a battery-driven tightening tool, the battery may be drained relatively fast, requiring a battery change. The productivity achieved with a tightening tool may thus not be close to optimal.

In view of the above, an object of the present disclosure is to provide a method which solves, or at least mitigates, problems of the prior art.

There is hence according to a first aspect of the present disclosure provided a method of controlling an electric motor of a tightening tool during a tightening operation, the method comprising: a) controlling the electric motor to run at a first motor speed using a first motor speed setpoint value, b) obtaining a torque or motor current value of the electric motor, c) determining a second motor speed setpoint value lower than or equal to the first motor speed setpoint value, based on an efficiency of the tightening tool at the torque or motor current value and the first motor speed setpoint value, d) setting the second motor speed setpoint value as the first motor speed setpoint value, e) controlling the electric motor to run at a second motor speed using the first motor speed setpoint value after step d), and repeating steps b)-e) until a predetermined motor speed or torque has been reached.

The heat developed in the tightening tool is reduced, because the second motor speed setpoint value is determined based on the efficiency of the tightening tool. Since less heat is developed, it may not be required to cool down the tightening tool by resting after heavy use, or at least less resting will be necessary. Further, the power consumption of the tightening tool is reduced. As a result, more tightening operations can be performed per battery charge in case the method is used with a battery powered tightening tool. Less power will in general be needed for the operation of the tightening tool, resulting in less energy consumption from the electric grid.

In general, higher productivity may be achieved by means of the method.

Moreover, the rating of the electric motor may be reduced compared to current solutions, as the electric motor in tightening tools available on the market may in some cases be over dimensioned due to lower efficiency. A tightening tool controlled by the methods disclosed herein may thus become lighter and/or cheaper.

The efficiency is based on the ratio between the power that is input to the tightening tool and the mechanical power that is output by the tightening tool. The efficiency may be the ratio or a normalization of the ratio.

The efficiency for a large number of different speeds and associated torques has in the design phase been determined for a specific tightening tool model/type. These predetermined efficiencies are used by the method to determine the second motor speed setpoint value in step c).

The tightening tool may be battery-driven or powered via an electric cord.

The tightening tool may for example be a nutrunner or a screwdriver.

A tightening operation is an operation of performing a tightening of a fastener from start to completion by rotation of an output shaft of the tightening tool. A fastener may for example be a nut, bolt, or screw.

The method may be run during the entire tightening operation or only during a portion of the tightening operation.

The electric motor may for example be a permanent magnet direct current (PMDC) motor.

According to one embodiment the second motor speed setpoint value is within a speed range of at most 500, 100 or 10 revolutions per minute, RPM, from the first motor speed setpoint value.

According to one embodiment the efficiency is at most 20% from a highest possible efficiency in the speed range for the torque or motor current value, such as at most 15% from a highest possible efficiency in the speed range for the torque or motor current value, such as at most 10% from a highest possible efficiency in the speed range for the torque or motor current value, such as at most 5% from a highest possible efficiency in the speed range for the torque or motor current value, such as the highest possible efficiency in the speed range for the torque or motor current value.

Thus, the efficiency used for determining the second motor speed setpoint value is close to, or is, the optimal efficiency for the torque or motor current value in a region of where the motor is being operated in terms of speed.

According to one embodiment the efficiency is a total efficiency of the electric motor, a geartrain of the tightening tool, and of electronics of the tightening tool. The efficiency is thus not solely that of the electric motor but includes other components of the tightening tool too. The electronics may for example comprise a power converter that controls the electric motor.

According to one embodiment step c) involves obtaining the second motor speed setpoint value from a look-up table which associates each torque or motor current value and corresponding motor speed setpoint value with an efficiency of the tightening tool.

According to one embodiment step c) involves obtaining the second motor speed setpoint value based on a function which associates each torque or motor current value and corresponding motor speed setpoint value with an efficiency of the tightening tool.

With "corresponding" in this context is meant the motor speed setpoint value with which the electric motor was controlled at the torque or motor current value in question when the look-up table or function was determined.

The torque or motor current and the first motor speed setpoint value may be used as input to the function, which outputs the second motor speed setpoint.

The function may have been created in the design phase with a designer-selected level of efficiency associated with each torque or current value and motor speed setpoint value.

According to one embodiment the efficiency at each motor speed setpoint value is a normalized efficiency, the normalization of each efficiency being with respect to an associated motor speed setpoint value.

In case the tightening operation involves performing a predetermined number of turns of the fastener, the amount of time necessary for carrying out the tightening operation is in this example taken into account by normalised the efficiency.

According to one embodiment the normalization involves a multiplication of the efficiency with the associated motor speed setpoint value divided with a maximum speed of the electric motor.

According to one embodiment the first motor speed setpoint value is user-defined. The method may thus involve receiving the first motor speed setpoint value as a user-input.

According to one embodiment the predetermined motor speed or torque is user-defined. The method may thus involve receiving the predetermined motor speed or torque as a user-input.

According to one embodiment the first motor speed setpoint value is an initial motor speed of the tightening operation.

According to one embodiment the predetermined motor speed is a final motor speed of the tightening operation. The final motor speed may be the final speed before the tightening operation has been completed.

There is according to a second aspect of the present disclosure provided a tightening tool controller comprising processing circuitry configured to perform the method of the first aspect.

There is according to a third aspect of the present disclosure provided a tightening tool system comprising: a tightening tool comprising an electric motor, and the tightening tool controller of the second aspect, configured to control the electric motor.

According to one embodiment the tightening tool controller is integrated in the tightening tool or is external to the tightening tool.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
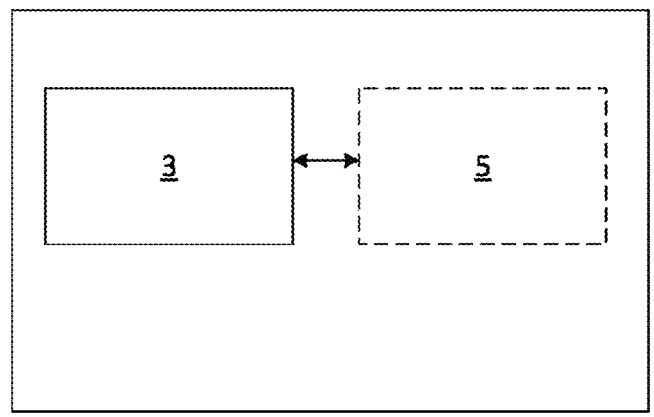
FIG. 1 schematically shows a block diagram of a tightening tool controller for a tightening tool.

FIG. 1 schematically depicts a block diagram of a tightening tool controller 1 for controlling a tightening tool.

The tightening tool controller 1 comprises processing circuitry 3. The processing circuitry 3 is configured to execute steps to perform the method as disclosed herein.

The processing circuitry 3 may for example use any combination of one or more of a suitable central processing unit (CPU), multiprocessor, microcontroller, digital processor (DSP), application specific integrated circuit (ASIC), field programmable gate arrays (FPGA) etc.

The tightening tool controller 1 may optionally comprise a storage medium 5 comprising a computer program which when executed by the processing circuitry 3 performs the steps of the method as disclosed herein.

The storage medium 5 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2:
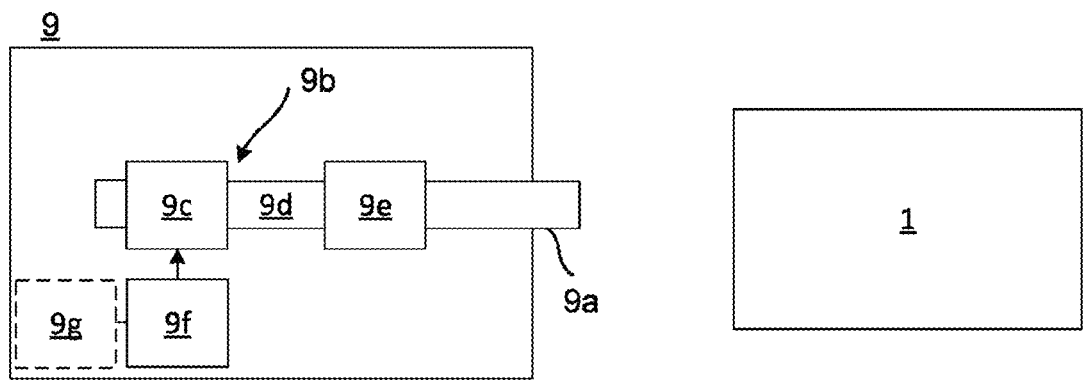
FIG. 2 schematically shows a tightening tool system comprising the tightening tool controller in FIG. 1.

FIG. 2 shows an example of tightening tool system 7. The tightening tool system 7 comprises the tightening tool controller 1 and a tightening tool 9.

The tightening tool controller may be external to the tightening tool 9 as in the example shown in FIG. 2.

Alternatively, the tightening tool 9 may according to one variation comprise the tightening tool controller 1.

If the tightening tool controller 1 is freestanding or external to the tightening tool 9, the tightening tool controller 1 and the tightening tool 9 may be configured to communicate with each other wirelessly or by wired connection.

The tightening tool 9 is an electrically powered tightening tool. The tightening tool 9 may be battery powered or powered electrically via a cord.

The tightening tool 9 may for example be a nutrunner or a screwdriver.

The tightening tool 9 has an output shaft 9a. The output shaft 9a is configured to be rotatably driven and engage with a fastener such as a nut, a bolt, or a screw.

The tightening tool 9 comprises an electric motor 9b configured to drive the output shaft 9a.

The tightening tool 9 may comprise a geartrain 9b connecting the electric motor 9b to the output shaft 9a.

The electric motor 9b has a stator 9c, and a rotor 9d configured to rotate relative to the stator 9c.

The tightening tool 9 comprises electronics. The electronics may comprise a power converter 9f, e.g., an inverter. The power converter 9f is configured to control the electric motor 9b.

The tightening tool controller 1 may be configured to control the power converter 9f to thereby control the speed of the electric motor 9b.

Control of the power converter 9f by the tightening tool controller 1 may cause modulation of the battery current fed to the power converter 9f from the battery 9g to thereby control the speed of the electric motor 9b.

The tightening tool 9 may comprise a battery 9g connected to the power converter 9f to power the electric motor 9b.

The tightening tool 9 may comprise a motor current sensor (not shown) configured to determine the motor current. The tightening tool controller 1 may be configured to determine the motor torque based on the motor current, which is proportional to the motor torque.

Figure 3:
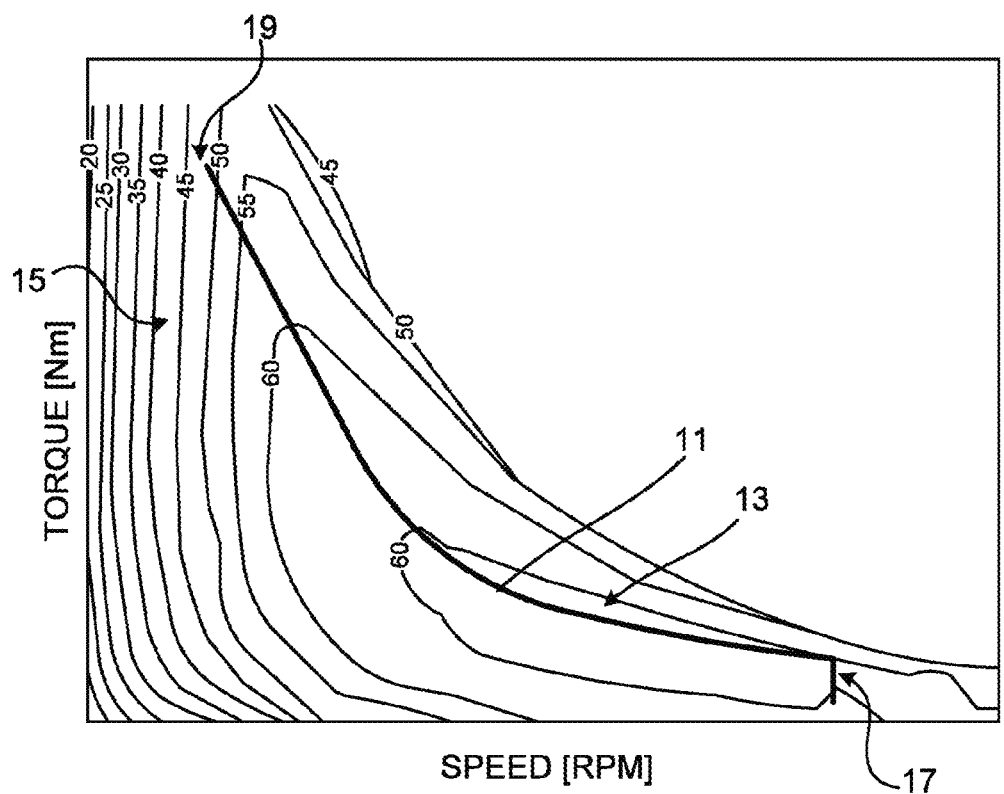
FIG. 3 shows an example of a graph showing the efficiency of a tightening tool with respect to torque and speed.

FIG. 3 shows an example of a graph of the efficiency of the tightening tool 9 in relation to torque and speed of the electric motor 9b. The efficiency is shown in the form of an efficiency map with different operating regions having different efficiency. In FIG. 3, the exemplified efficiency map shows the combined efficiency of the electric motor, the power converter and the geartrain.

The method disclosed herein takes the efficiency of the tightening tool 9 into account in the control of the electric motor 9b by means of the tightening tool controller 1.

The efficiency is the total efficiency of the tightening tool 9 including the electric motor 9b, the geartrain 9e, and electronics such as the power converter 9f.

The efficiency of the tightening tool 9 may be obtained in a procedure during the design stage by measuring the power input to the tightening tool 1 and the corresponding mechanical power output by the tightening tool 9 for a large number of motor speeds and torques. The motor speed, torque and efficiency may then be visualized in an efficiency map such as the one depicted in FIG. 3. The efficiency map comprises regions of high efficiency such as region 13 and regions of low efficiency such as region 15.

According to one example, a look-up table is constructed in the design phase where each torque or current and motor speed pair are associated with a corresponding efficiency.

Alternatively, or additionally, the designers may construct a function 11 which associates each pair of torque and motor speed with a corresponding efficiency. The function 11 can be selected according to a preferred efficiency in the design stage.

In the example in FIG. 3, the function 11 has been defined essentially in the most efficient region at any point between the starting point 17 and the end point 19 of the tightening operation and is in this sense essentially optimal with respect to efficiency over the entire tightening operation. Other functions could also be selected, for example with lower efficiency than the depicted example.

The function may consist of a single function from start to end of the tightening operation, or it can be made up of several functions, each function being defined over a motor speed subrange, for example. Alternatively, the function may consist of a single function defined on a motor speed subrange only. The control strategy disclosed herein may in this case be run only in the motor speed subrange, or if several functions are defined in different motor speed subranges, the control strategy will run in the motor speed subranges only.

Figure 4:
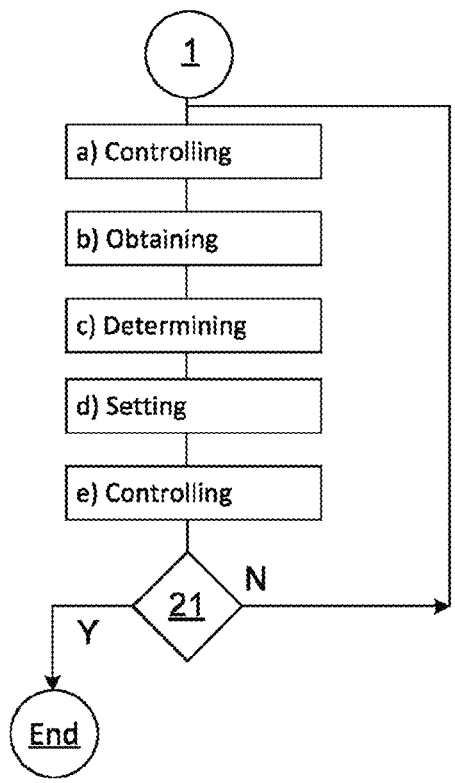
FIG. 4 is a flowchart of a method of controlling a tightening tool.

FIG. 4 shows a method of controlling tightening tool 9 by means of the tightening tool controller 1 during a tightening operation.

In a step a) the electric motor 9b is controlled to run at a first motor speed using a first motor speed setpoint value.

The first motor speed setpoint value may for example be user-defined. The first motor speed setpoint value may for example be set according to the needs of a specific tightening operation.

The first motor speed may be the initial motor speed of the tightening operation. The initial motor speed may thus be the start speed of the electric motor 9b when the tightening operation begins.

Alternatively, the first motor speed may be a motor speed attained after the tightening operation has begun, defining the starting point of a motor speed subrange. The first motor speed may thus in some examples be different from the initial motor speed.

In a step b) a torque or motor current value of the electric motor 9b is obtained. The torque or motor current value may for example be obtained by measurement using the motor current sensor, or it can be obtained by estimation.

In a step c) a second motor speed setpoint value lower than or equal to the first motor speed setpoint value is determined. The second motor speed setpoint value is determined based on an efficiency of the tightening tool 9 at the torque or motor current value obtained in step b) and the first motor speed setpoint value.

Step c) may according to one example involve obtaining the second motor speed setpoint value from a look-up table. The look-up table associates each torque or motor current value and corresponding motor speed setpoint value with an efficiency of the tightening tool. When a torque or motor current value has been obtained, an efficiency associated with the torque or motor current value is selected and thus the motor speed setpoint value associated with the efficiency, i.e., the second motor speed setpoint value, is determined.

There are generally many efficiencies associated with each torque or motor current value, for different motor speed setpoint values. The efficiency may be selected in the look-up table based on that the motor speed setpoint value with which the efficiency is to be within a speed range of at most 500, 100 or 10 revolutions per minute, RPM from the first motor speed setpoint value. The efficiency that is selected may for example be the highest possible efficiency for the torque or motor current value within the speed range. According to some examples, the efficiency that is selected is at most 15%, 10%, or 5% from a highest possible efficiency in the speed range for the torque or motor current value.

Step c) may according to one example involve obtaining the second motor speed setpoint value based on a function. The function associates each torque or motor current value and corresponding motor speed setpoint value with an efficiency of the tightening tool. The function is predetermined and may for example have been derived when the method is being adapted to a specific tightening tool model.

The function may be defined such that it outputs a second motor speed setpoint value within a speed range of at most 500, 100 or 10 revolutions per minute, RPM from the first motor speed setpoint value.

According to one example, the efficiency at each motor speed setpoint value is a normalized efficiency with respect to the associated motor speed setpoint value. The efficiency is in this case weighted. Instead of e.g., a percentual number, the normalized efficiency may be given as Joules/time unit.

The normalization may involve multiplying each efficiency with its associated motor speed setpoint value divided with a maximum speed of the electric motor.

In a step d) the second motor speed setpoint value is set as the first motor speed setpoint value.

In a step e) the electric motor 9b is controlled to run at a second motor speed using the first motor speed setpoint value. Step e) is carried out after step d), i.e., with the newly set first motor speed setpoint value.

Steps b)-e) are repeated until a predetermined motor speed or torque has been reached. For example, the latest first motor speed setpoint value may be compared with the predetermined motor speed or the latest torque or motor current value may be compared with the predetermined torque, as shown in box 21. If the comparison determines that the predetermined motor speed or torque has been reached, the method ends.

The predetermined motor speed or torque may be user-defined. The predetermined motor speed or torque may be adapted to the specific needs of a tightening operation.

The predetermined motor speed or torque may be a final motor speed of the tightening operation, i.e., when the tightening operation is completed.

Alternatively, the predetermined motor speed or torque may be an end point of a subrange of the complete range of motor speed setpoint values used during a tightening operation.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of controlling an electric motor of a tightening tool during a tightening operation, the method comprising:
   a) controlling the electric motor to run at a first motor speed using a first motor speed setpoint value;
   b) obtaining a torque or motor current value of the electric motor;
   c) determining a second motor speed setpoint value lower than or equal to the first motor speed setpoint value, based on an efficiency of the tightening tool at the torque or motor current value and the first motor speed setpoint value;
   d) setting the second motor speed setpoint value as the first motor speed setpoint value;
   e) controlling the electric motor to run at a second motor speed using the first motor speed setpoint value after step d); and
   repeating steps b)-e) until a predetermined motor speed or torque has been reached,
   wherein the second motor speed setpoint value is within a speed range of at most 500 revolutions per minute from the first motor speed setpoint value, and
   wherein the efficiency is at most 20% from a highest possible efficiency in the speed range for the torque or motor current value.

2. The method as claimed in claim 1, wherein the second motor speed setpoint value is within a speed range of either: at most 100 or at most 10 revolutions per minute from the first motor speed setpoint value.

3. The method as claimed in claim 2, wherein the efficiency is one of:
   at most 15% from a highest possible efficiency in the speed range for the torque or motor current value,
   at most 10% from a highest possible efficiency in the speed range for the torque or motor current value,
   at most 5% from a highest possible efficiency in the speed range for the torque or motor current value, or
   the highest possible efficiency in the speed range for the torque or motor current value.

4. The method as claimed in claim 1, wherein the efficiency is a total efficiency of the electric motor, a geartrain of the tightening tool, and of electronics of the tightening tool.

5. The method as claimed in claim 1, wherein step c) involves obtaining the second motor speed setpoint value from a look-up table which associates each torque or motor current value and corresponding motor speed setpoint value with an efficiency of the tightening tool.

6. The method as claimed in claim 1, wherein step c) involves obtaining the second motor speed setpoint value based on a function which associates each torque or motor current value and corresponding motor speed setpoint value with an efficiency of the tightening tool.

7. The method as claimed in claim 1, wherein the efficiency at each motor speed setpoint value is a normalized efficiency, the normalization of each efficiency being with respect to an associated motor speed setpoint value.

8. The method as claimed in claim 7, wherein the normalization involves a multiplication of the efficiency with the associated motor speed setpoint value divided with a maximum speed of the electric motor.

9. The method as claimed in claim 1, wherein the first motor speed setpoint value is user-defined.

10. The method as claimed in claim 1, wherein the predetermined motor speed or torque is user-defined.

11. The method as claimed in claim 1, wherein the first motor speed setpoint is an initial motor speed of the tightening operation.

12. The method as claimed in claim 1, wherein the predetermined motor speed is a final motor speed of the tightening operation.

13. A tightening tool controller comprising processing circuitry configured to control an electric motor of a tightening tool during a tightening operation by performing the following operations:
   a) controlling the electric motor to run at a first motor speed using a first motor speed setpoint value;
   b) obtaining a torque or motor current value of the electric motor;
   c) determining a second motor speed setpoint value lower than or equal to the first motor speed setpoint value, based on an efficiency of the tightening tool at the torque or motor current value and the first motor speed setpoint value;
   d) setting the second motor speed setpoint value as the first motor speed setpoint value;
   e) controlling the electric motor to run at a second motor speed using the first motor speed setpoint value after step d); and
   repeating steps b)-e) until a predetermined motor speed or torque has been reached,
   wherein the second motor speed setpoint value is within a speed range of at most 500 revolutions per minute from the first motor speed setpoint value, and
   wherein the efficiency is at most 20% from a highest possible efficiency in the speed range for the torque or motor current value.

14. A tightening tool system comprising:

a tightening tool comprising an electric motor; and the tightening tool controller, configured to control the electric motor during a tightening operation by performing the following operations:
- a) controlling the electric motor to run at a first motor speed using a first motor speed setpoint value;
- b) obtaining a torque or motor current value of the electric motor;
- c) determining a second motor speed setpoint value lower than or equal to the first motor speed setpoint value, based on an efficiency of the tightening tool at the torque or motor current value and the first motor speed setpoint value;
- d) setting the second motor speed setpoint value as the first motor speed setpoint value;
- e) controlling the electric motor to run at a second motor speed using the first motor speed setpoint value after step d); and repeating steps b)-e) until a predetermined motor speed or torque has been reached, wherein the second motor speed setpoint value is within a speed range of at most 500 revolutions per minute from the first motor speed setpoint value, and wherein the efficiency is at most 20% from a highest possible efficiency in the speed range for the torque or motor current value.

15. The tightening tool system as claimed in claim 14, wherein the tightening tool controller is one of integrated in the tightening tool or is-external to the tightening tool.

* * * * *